United States Patent
Yu (10) Patent No.: US 10,302,821 B2
(45) Date of Patent: May 28, 2019

(54) TINTING ENHANCERS FOR HARD COAT TINTING

(71) Applicant: ESSILOR INTERNATIONAL, Charenton le Pont (FR)

(72) Inventor: Hui Yu, Singapore (SG)

(73) Assignee: ESSILOR INTERNATIONAL, Charenton-le-Pont (FR)

(*) Notice: Subject to any disclaimer, the term of this patent is extended or adjusted under 35 U.S.C. 154(b) by 533 days.

(21) Appl. No.: 14/787,898

(22) PCT Filed: Apr. 29, 2014

(86) PCT No.: PCT/EP2014/058752
§ 371 (c)(1),
(2) Date: Oct. 29, 2015

(87) PCT Pub. No.: WO2014/177580
PCT Pub. Date: Nov. 6, 2014

(65) Prior Publication Data
US 2016/0077241 A1  Mar. 17, 2016

(30) Foreign Application Priority Data

Apr. 29, 2013 (EP) .................................. 13305562

(51) Int. Cl.
G02B 1/11 (2015.01)
G02B 1/14 (2015.01)
G02B 1/04 (2006.01)
G02C 7/10 (2006.01)

(52) U.S. Cl.
CPC ............... *G02B 1/14* (2015.01); *G02B 1/04* (2013.01); *G02B 1/043* (2013.01); *G02B 1/11* (2013.01); *G02C 7/10* (2013.01)

(58) Field of Classification Search
CPC .......... B29D 11/00442; B29D 11/0073; B29L 2011/0016; G02B 1/11; G02B 1/14; C08L 63/00

See application file for complete search history.

(56) References Cited

U.S. PATENT DOCUMENTS

| | | | |
|---|---|---|---|
| 5,102,695 A | 4/1992 | Guest et al. | |
| 6,008,285 A | 12/1999 | Kasemann et al. | |
| 6,028,618 A * | 2/2000 | Defieuw | B41J 2/1606 347/202 |
| 6,225,439 B1 | 5/2001 | Bayer et al. | |
| 8,084,133 B2 | 12/2011 | Colton | |
| 2005/0164104 A1 * | 7/2005 | Tong | G03G 5/0546 430/58.05 |
| 2008/0047468 A1 | 2/2008 | De Rojas | |

FOREIGN PATENT DOCUMENTS

| | | |
|---|---|---|
| WO | WO1997/045498 | 12/1997 |
| WO | WO2008/060102 | 5/2008 |

* cited by examiner

*Primary Examiner* — Gregory Listvoyb
(74) *Attorney, Agent, or Firm* — Norton Rose Fulbright US LLP (57) ABSTRACT

The invention pertains to a tintable hard coat composition for forming a film on an optical article, the composition comprising at least one tinting enhancer, and at least two polymerizable monomers, a first monomer being an hydrolysat of an alkoxysilane comprising at least two alkoxy groups and one epoxy group, and a second monomer having at least two functional groups reacting with the first monomer, at least one of the two monomers having three functional groups of the same kind; the tinting enhancer being preferably chosen from the group consisting of 4-(methyl mercapto) phenol, 4,4' thiodiphenol, 4,4'-Sulfonyldiphenol, and 3,3'-(Ethylenedioxy)diphenol or a mix thereof: Formulas (I), (II), (III), (IV).

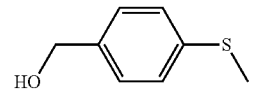

(I)

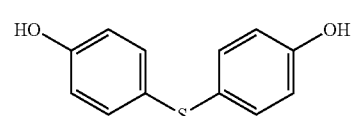

(II)

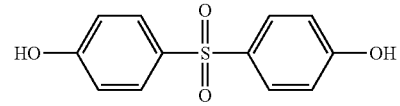

(III)

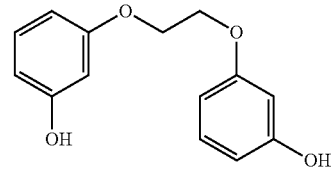

(IV)

10 Claims, 2 Drawing Sheets

TINTING ENHANCERS FOR HARD COAT TINTING

CROSS-REFERENCE TO RELATED APPLICATIONS

This application is a national phase application under 35 U.S.C. § 371 of International Application No. PCT/EP2014/058752 filed 29 Apr. 2014, which claims priority to European Patent Application No. 13305562.4 filed 29 Apr. 2013. The entire contents of each of the above-referenced disclosures is specifically incorporated by reference herein without disclaimer.

The present invention pertains to a method for dyeing substrates or films to obtain tinted substrates or articles, for example tinted optical or ophthalmic lenses. In particular the invention pertains to the problem of tinting lenses for the ophthalmic industry, considering the high transparency, low haze and mechanical properties necessary in this optical field.

Ophthalmic lenses of transparent organic material (organic glass) are lighter and less brittle than mineral glass and are now widely used. One of the polymer used as organic glass for ophthalmic lenses is Polycarbonate. Indeed, it is a polymer widely used to make plastic solids due to its high resistance to breakage compared to its weight. Further, it has the advantage of existing in low-haze, high transparency compositions and it is relatively cheap to manufacture as it is a thermoplastic material.

However, substrates of polycarbonate material are difficult to tint with conventional processes such as conventional direct bath tinting due to its compact surface morphology and high glass transition temperature. Water bath tinting is usually not suitable because of its limited dye absorption amount, even during prolonged time. It is thus difficult for the ophthalmic industry to produce polycarbonate-based lenses which have a tinting with the quality necessary for ophthalmic grades-lenses.

Some known techniques are to deposit a tintable or tinted hard-coat layer on top of the polycarbonate substrate. Such hard coat is rendered tintable by addition of tinting enhancer compounds: see U.S. Pat. Nos. 6,225,439 or 8,084,133 which relate to tintable hard coats. However, in most of the prior art the introduction of tinting enhancer compounds comes with a reduction of the abrasion resistance performances of the hard coat. Often one has to choose between tinting enhancers that improve tintability by a significant margin and tinting enhancer compounds that do not deteriorate abrasion resistance below acceptable levels.

The invention aims to provide a range of tinting enhancer compounds that improve tintability of a sol-gel hard coat. These and other advantages are achieved in accordance with the present invention as described below.

The invention discloses a tintable hard coat composition for forming a film on an optical article, the composition comprising at least one tinting enhancer, and at least two polymerizable monomers, a first monomer being an hydrolysat of an alkoxysilane comprising at least two alkoxy groups and one epoxy group, and a second monomer having at least two functional groups reacting with the first monomer, at least one of the two monomers having three reacting functional groups of the same kind;

wherein the tinting enhancer is chosen from the compounds represented by the following formulae (1):

$$A1\text{-}(P1\text{-}OH)_n \quad (1)$$

Wherein
n=1 or 2
P1 represents one of a (C5-C12) arylene group and a (C5-C12) heteroarylene group, If n=1, A1 is one of an (C1-C6) oxyalkyl group, linear or branched, with 0 to 3 non-consecutive carbons replaced by N, O or S and a (C1-C6) thioalkyl group, linear or branched, with 0 to 3 non-consecutive carbons replaced by N, O or S. And if n=2, A1 represents one of a —O— group, a —S— group, a —S(O)2- group, a (C0-C6) alkylene group, linear or branched, with 0 to 3 non-consecutive carbons replaced by N, O or S, a (C1-C6) oxyalkylene group, linear or branched, with 0 to 3 non-consecutive carbons replaced by N, O or S, with the oxy part of it linking with P1, or a (C1-C6) thioalkylene group, linear or branched, with 0 to 3 non-consecutive carbons replaced by N, O or S, with the thio part of it linking with P1. It is thus well understood that and oxyalkyl (respectively thioalkyl) group is an oxylakylene group (respectively thioalkylene group) with one valence linked to an hydrogen atom, leaving one valence on the oxygen (respectively sulphur).

When an optical article comprising a film formed using the tintable hard coat composition of the invention is dipped into a tinting bath, part of the tinting enhancer diffuses out of the tintable hard coat and into the tinting bath, making room for dyes or tint compounds to enter the film.

If n=1, a preferred embodiment is to have A1 as a thioalkoxy group, such as a methylmercapto group.

If n=2, a preferred embodiment is to have A1 as one of a —S— group, a —S(O)$_2$— group or a dioxyalkylene group.

A dioxyalkylene group is defined in the invention as meaning a specific oxyalkylene bivalent group for which the carbon bearing the carbon radical is replaced by an oxygen atom, which means that both valence radicals are —O— radicals. In especially means a —O—(CxHy)-O— group, wherein the CxHy part is a (C1-C5) alkylene group, linear or branched, with 0 to 2 non-consecutive carbons replaced by N, O or S, the hydrogen atoms being adapted in consequence. It is well understood that in case some carbons are replaced by N, O or S atoms, the replaced carbon is supposed to not be consecutive with any of the terminal —O— of the —O—(CxHy)-O— group.

It is to be noted that the wording "reacting functional groups of the same kind", means the those functional groups "of the same kind" are counted only if those are functional groups of the first monomer which are supposed to react with functional groups of the second monomer or vice-versa. Further, the wording "of the same king" means that the functional groups itself are identical, not that any hetero-alkylene group which might link one functional group to the others functional groups have to be identical.

P1 may be a phenylene group or a toluylene group.

Preferably the tinting enhancer is chosen from the following group of compounds: (o,m,p)Methoxyphenol, (o,m,p)methylmercapto-phenol, (o,m,p)methoxy benzyl alcohol, (o,p)methylmercapto-benzyl alcohol, 2,2'oxydiphenol, 4,4'oxydiphenol, 2,2'thiodiphenol, 4,4'thiodiphenol, 2,2'-Sulfonyldiphenol, 3,3'-Sulfonyldiphenol, 2,4'-Sulfonyldiphenol, 4,4'-Sulfonyldiphenol (bisphenol S), bisphenol A, 3,3'-(Ethylenedioxy)diphenol, 4,4'-(Ethylenedioxy)diphenol, 2,2'-Dihydroxybiphenyl, 3,3'-Dihydroxybiphenyl, 4,4'-Dihydroxybiphenyl.

The tinting enhancer may also be one of the variants of the previous compounds for which at least one phenylen group is substituted with an alkyl (C1-C6) group, linear or branched, with 0 to 3 non-consecutive carbons replaced by N, O or S. It is to be noted that the invention also relates to cases where the compound might not be symmetrical even in case n=2. Such cases are only related to cases where one phenylen group is substituted with an alkyl (C1-C6) group, linear or branched, with 0 to 3 non-consecutive carbons replaced by N, O or S, a substituted alkylene group being different on one phenylen group than on the other phenylene group.

In particular the tinting enhancer may also be one of the variants of the previous compounds for which at least one phenylen group is substituted with a methyl group such as 2,2'-thiobis[4-methyl-Phenol] and 4,4'-thiobis[2-methyl-Phenol], 2-Methoxy-4-methylphenol, 4-Methoxy-2-methylphenol, 2-Methoxy-3-methylphenol, 3-Methoxy-2-methylphenol, 2-Methoxy-4-methylbenzyl alcohol, 4-Methoxy-2-methylbenzyl alcohol, 4-Methoxy-3-methylbenzyl alcohol, 2,2'-Dimethyl-4,4'-thiodiphenol, 4,4', thiobis[2-methyl-benzene thiol] . . . etc. More preferably the tinting enhancer is chosen from the group consisting of 4-(methyl mercapto) phenol, 4,4' thiodiphenol, 4,4'-Sulfonyldiphenol, and 3,3'-(Ethylenedioxy)diphenol or a mix thereof, illustrated bellow, respectively in formulas 2, 3, 4 and 5:

Formula 2

4-(methyl mercapto) phenol
(CAS 1073-72-9)

Formula 3

4,4' thiodiphenol (CAS 2664-63-3)

Formula 4

4,4'-Sulfonyldiphenol (CAS 80-09-1)

Formula 5

3,3'-(Ethylenedioxy)diphenol
(CAS 61166-00-5)

The first monomer is preferably an hydrolysat of one of a polyalkoxysilane selected from the group consisting of di(glycidyl $C_{1-3}$ alkyl)-di(alkoxy)silanes, $(C_{1-3}$ alkyl)(glycidyl $C_{1-3}$ alkyl)-di(alkoxy)silanes and (glycidyl $C_{1-3}$ alkyl) tri(alkoxy)-silanes.

The first monomer is preferably be an hydrolysat of one of a 3-Glycidoxypropyltrimethoxysilane and a glycidoxypropylmethyldiethoxysilane or a mixture thereof. The second monomer may be one of hydrolysats of polyalkoxysilane monomers, polyfunctional acrylate monomers, polyfunctional epoxy monomers and mixtures thereof.

The second monomer may thus be a polyalkoxysilane selected from the group consisting of di($C_{1-3}$ alkyl)-di(alkoxy)silanes, di(glycidyl $C_{1-3}$ alkyl)-di(alkoxy)silanes and $(C_{1-3}$ alkyl)(glycidyl $C_{1-3}$ alkyl)-di(alkoxy)silanes, $(C_{1-3}$ alkyl)-tri(alkoxy)silanes and tetra(alkoxy)silanes.

The second monomer may also be a polyfunctional acrylate monomer, preferably selected from the group consisting of diacrylate, triacrylate and tetraacrylate monomers, such as pentaerythritol triacrylate or pentaerythritol tetraacrylate. The addition of polyfunctional acrylate monomers results in improved scratch resistance and better adherence to thermoplastic substrates.

When polyfunctional acrylate monomers are used in combination with the first monomer, the coating composition advantageously further contains at least one free radical photo-initiator, preferably from 1% to 5% by weight, more preferably from 1.5 to 4.5 by weight, relative to the polyfunctional acrylate monomers, of a free radical photo-initiator. Such free radical photo-initiators can be selected for example from haloalkylated aromatic ketones such as chloromethylbenzophenones; some benzoin ethers such as ethyl benzoin ether and isopropyl benzoin ether; dialkoxyacetophenones such as diethoxyacetophenone and α,α-dimethoxy-a-phenylacetophenone; hydroxy ketones such as (1-[4-(2-hydroxyethoxy)-phenyl]-2-hydroxy-2-methyl-1-propan-1-one) (Irgacure<(R)>2959 from CIBA), 1-hydroxy-cyclohexyl-phenyl-ketone (Irgacure<(R)>184 from CIBA) and 2-hydroxy-2-methyl-1-phenylpropan-1-one (such as Darocur<(R)>1173 sold by CIBA); alpha amino ketones, particularly those containing a benzoyl moiety, otherwise called alpha-amino acetophenones, for example 2-methyl 1-[4-phenyl]-2-morpholinopropan-1-one (Irgacure<(R)>907 from CIBA), (2-benzyl-2-dimethyl amino-1-(4-morpholinophenyl)-butan-1-one (Irgacure<(R)>369 from CIBA); monoacyl and bisacyl phosphine oxides and sulphides, such as phenylbis(2,4,6-trimethylbenzoyl)-phosphine oxide (Irgacure<(R)>819 sold by CIBA); triacyl phosphine oxides; and mixtures thereof.

The second monomer may also be a non-alkoxysilane polyfunctional epoxy monomer preferably selected from the group consisting of diglycerol tetraglycidyl ether, dipentaerythritol tetraglycidyl ether, sorbitol polyglycidyl ether, polyglycerol polyglycidyl ether, pentaerythritol polyglycidyl ether such as pentaerythritol tetraglycidyl ethertrimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, Castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-Epoxycyclohexane) methyl 3,4-epoxycylohexylcarboxylate and mixtures thereof. The second monomer is preferably one of polyglycidylether monomers and an hydrolysat of a poly alkoxysilane monomers.

The second monomer is even more preferably chosen as one of dimethyl-diethoxy-silane (DMDES), tetraethoxy-silane (TEOS), trimethylolpropane triglycidyl ether or a mixture thereof.

The tintable hard coat composition may further contain an oxidized metal compound such as cerium oxides, silicon oxides, tantalum oxides, tin oxides, titanium oxides or alkoxydes and zirconium oxides. The oxydized metal compounds can advantageously be present in the form of colloids or in dispersed form.

The tintable hard coat composition may a total amount of tinting enhancer is comprised between 0.01 mol per 100 grams of composition's solid contents and 0.05 mol per 100 grams of composition's solid contents included.

Preferably, the total amount of tinting enhancer is comprised between 0.013 mol per 100 grams of composition's solid contents and 0.03 mol per 100 grams of composition's solid contents included.

The invention further concerns an optical article comprising a hard coat layer, which hard coat layer is formed by polymerisation of at least two polymerizable monomers, a first monomer being an hydrolysat of an alkoxysilane comprising at least two alkoxy groups and one epoxy group, and a second monomer having at least two functional groups reacting with the first monomer, at least one of the two monomers having three functional groups of the same kind, the hard coat layer comprising at least one tinting enhancer, the tinting enhancer being chosen from the compounds represented by the following formulae (1):

A1-(P1-OH)n                                         (1)

Wherein:

n=1 or 2

P1 is identical or different and represents one of a (C5-C12) arylene group and a (C5-C12) heteroarylene group, A1 represents one of a —O— group, a —S— group, a —S(O)2- group, a (C0-C6) alkylene group, linear or branched, with 0 to 3 non-consecutive carbons replaced by N, O or S, a (C1-C6) oxyalkylene group, linear or branched, with 0 to 3 non-consecutive carbons replaced by N, O or S, with the oxy part of it linking with P1, or a (C1-C6) thioalkylene group, linear or branched, with 0 to 3 non-consecutive carbons replaced by N, O or S, with the thio part of it linking with P1, And if n=1, A1 is one of an oxyalkylene group and a thioalkylene group, And further, the tinting enhancer is present with an amount, per 100 grams of solid content, comprised in the range [0.01 mol/100 g; 0.05 mol/100 g.

The invention is also related to a method for dyeing an optical article, said method comprising the following successive steps:

a) Depositing a layer of the tintable hard coat composition of the invention on an optical article and, b) Curing this layer, forming a tintable hard coat on the optical article, c) Supplying of a tinting composition comprising dyes:

d) Tinting at least part of the tintable hard coat by exposure to the tinting composition for a time sufficient to allow the effective tinting of the tintable hard coat.

In an embodiment, an initial step of preparing the surface of the optical article to improve adhesion using an adhesion promoter is performed before depositing the layer of tintable hard coat composition on the optical article (or substrate).

The optical article may already comprise one or more coating layers before depositing the layer made of the hard coat composition according to the invention. The hard coat composition may be deposited using dip-coating, spin-coating, spraying or any other method known to the person killed in the art.

The optical article is preferably an optical lens.

"Optical lens", according to the invention, is defined namely as ophthalmological lenses and lenses for optical instruments; "ophthalmological lenses" are defined as lenses adapted namely for mounting in eyeglasses whose function is to protect the eye and/or to correct vision; these lenses are selected from the afocal, unifocal, bifocal, trifocal, and progressive lenses.

The optical lens may be made of polycarbonate, PMMA, or any other transparent material of ophthalmic grade used in the ophthalmic industry.

The optical lens is made of a material classically used in optics and ophthalmology. By way of information but not limitation, the materials are chosen from among the polycarbonates; polyamides; polyimides; polysulfones; copolymers of polyethylene there phthalate and polycarbonate; polyolefins, namely polynorbornenes; polymers and copolymers of diethylene glycol bis(allylcarbonate); (meth) acrylic polymers and copolymers, namely (meth)acrylic polymers and copolymers derived from bisphenol-A; thio (meth)acrylic polymers and copolymers; urethane and thiourethane polymers and copolymers; epoxy polymers and copolymers; and episulfide polymers and copolymers.

According to the invention, the tinting step can be done by spin-coating the tinting composition on top of at least part of the substrate.

Alternatively, the exposure step can be done by immersion of at least part of the substrate comprising the film obtained using the composition of the invention in a bath of the tinting composition, this type of exposure step is generally known by the word "dip" or "dipping".

The exposure step may be carried out once, or can be repeated several times, in order to manufacture a tinted substrate of higher intensity. This step can be carried out by the use of a dyeing apparatus, in which the substrate is contacted with the dye solution according to scheduled sequences.

The optical article carrying the hard coat obtained using the composition of the invention can be exposed to the tinting composition totally, or partially. If the substrate is immersed partially, generally only the surface of the immersed part of the film obtained using the composition of the invention is tinted.

The invention also relates to a tinted optical article tinted according to the process of the invention.

The tinted optical article may further comprise at least one anti-reflective stack on top of the tinted hard coat.

The exposure step can combine multiple exposure steps, at least two exposure steps covering different areas of the film obtained using the composition of the invention, one area exposed to the tinting composition during one exposure step being at least partially included in another exposed to the tinting composition during one exposure step without totally covering it. Thus it enables to create gradient-like tinting.

The optical article can be a commercially available product, or it can be manufactured just before the tinting.

The optical article has generally the shape of an article, such as an optical article or even an ophthalmic article.

The method according to the invention is rapid, reproducible and easy to carry out. Moreover the tinting of the part of the substrate which is immersed is substantially uniform.

In addition, this method allows the production of the whole range of coloration, from the lightest colour to the darkest colour.

The tinting solution can contain a dye of any dye type and particularly can be chosen from the group of azo type dyes, quinophtalones type dyes, and anthraquinone type dyes. It can be any commercial disperse dye sold by BASF, Clariant, Huntsman or any other provider of known disperse dyes.

However various known dyes mixture or dyes solutions used in dyeing can be used, as known to the one skilled in the art.

The tinting solutions which are suitable are commercially available disperse dye solutions, to be combined with at least one carrier according to the invention. For example, the dyes sold as BPI® Molecular Catalytic Tints by Brain Power International are available in more than 180 colours. The disperse dyes produced by Ciba, BASF, Dyestar, Clariants etc. are also useable for PC tinting.

In a variant, the dye solution contains 0.05% to 5%, preferably 0.2% to 1%, and more preferably around 0.5% by weight of a carrier compound.

The amount of the dye is not critical but is ordinarily 0.1 to 30% by weight in terms of concentration in the tinting composition, for example 0.5% or 0.75%.

The dye solution can comprise any other additive known to the one skilled in the art. According to the invention, the dye solution can contain an emulsifier, preferably chosen from the group of amine salts or alkali salts of carboxylic, sulfamic or phosphoric acids, acid salts of amines, ethoxylated or propoxylated alkyl or aryl phenolic compounds.

A surfactant, such as alkyl benzene sulfonate might be present in the tinting composition with a concentration ranging from 0% to 5% in weight included, preferably with a concentration ranging from 0.1% to 3% by weight included, more preferably with a concentration ranging from 0.2% to 2% by weight included.

Other surfactant which may be used include ionic, nonionic, or mixtures thereof. Exemplary surfactant might be anionic, including sodium and potassium dinaphtalene meta sulphonate, sodium salt of dodecyl benzene sulphonic acid (DDBSA), Lauryl ether sulphate sodium salt or potassium lauryl sulphate. Other surfactant may also be used if necessary, such as amphoteric surfactants, that are compounds bearing both anionic and cationic groups.

The method of the invention provides tinted substrates in a short time and achieves a higher tinting intensity with good uniformity.

The method of the invention enables tinting substrates to be provided of different luminous transmittance depending mainly on different tinting times and dye solutions of different dye concentration.

Preferably, the exposure of the substrate to the tinting composition has a duration that is within the range of from 3 to 120 minutes, preferably from 10 to 90 minutes, and more preferably from 30 to 60 minutes, such as 30 minutes.

The invention also concerns an article, preferably an ophthalmic lens, comprising a tinted hard coat which is obtained by the method described above.

According to the invention, the article is preferably such that the haze of the article is lower than 5%, preferably lower than 1%, and more preferably lower than 0.4%.

Said article may advantageously be further coated, after the tinting step, with coatings conventionally used in the ophthalmic optics field, such as further anti abrasion coatings, scratch resistant coatings or anti-reflection coatings.

The invention thus also concerns said article further comprising at least partially a coating.

Definitions

Alkyl groups represent monovalent groups derived from alkanes by removal of on hydrogen atom.

Alkylene groups represent bivalent groups derived from alkanes by removal of two hydrogen atoms. The removed hydrogen atoms may be removed either from one given carbon atom or from two different carbon atoms. A synonym is alkanediyl groups. The alkylene groups in the context of the invention may be linear or branched alkylenes.

An alkylene group in the context of the invention involves the presence of carbon atoms at every end: on the atoms from which the two hydrogen atoms cited above are removed and at the end of any branch in case of a branched alkylene.

Oxyalkyl groups represent monovalent groups derived from alcohols groups by removal of the hydrogen of the hydroxyl (—OH) radical. The alcohols groups, in this context, are derived from a-cyclic linear or branched alkanes by bonding an hydroxyl radical on one carbon atom in replacement of one hydrogen atom. In the context of the invention, oxyalkyl groups may comprise one or more terminal hydroxyl groups.

Oxyalkylene groups represent bivalent groups derived from alcohols groups by removal of the hydrogen of the hydroxyl (—OH) radical and one hydrogen from one carbon atom. The alcohols groups, in this context, are derived from a-cyclic linear or branched alkanes by bonding an hydroxyl radical on one carbon atom in replacement of one hydrogen atom.

In the present specification the term "dioxyalkylene groups" represents a sub-group of the oxyalkylene groups. Dioxyalkylene groups represent bivalent groups derived from dialcohols by removal of the hydrogen of both hydroxyl (—OH) radicals. It thus represents a —O—(CxHy)-O— group, wherein the CxHy part is a (C1-C4) alkylene group, linear or branched, with 0 to 2 non-consecutive carbons replaced by N, O or S, the hydrogen atoms being adapted in consequence. It is well understood that in case some carbons are replaced by N, O or S atoms, the replaced carbon is not consecutive with any of the terminal —O— of the —O—(CxHy)-O— group.

Thioalkyl groups represent monovalent groups derived from a-cyclic alkanethiols by removal of the hydrogen of the sulfhydryl (—SH) radical. In the context of the invention, thioalkyl groups may comprise one or more terminal hydroxyl groups. Further in the context of the invention, the sulphur atom bearing the valence may form a sulphone bivalent group; however, in this case, at least one (C1-C6) alkyl group comprising at least one carbone atom is linked to the sulfur bearing the valence.

Thioalkylene groups represent bivalent groups derived from a-cyclic alkanethiols by removal of the hydrogen of the sulfhydryl (—SH) radical and one hydrogen from one carbon atom.

In the context of the invention, (C1-C6) oxyalkyl, oxylakylene, dioxyalkylene, thioalkyl and thiolakylene groups are intended, unless explicitly mentioned, to be linear or branched, with 0 to 3 non-consecutive carbons replaced by N, O or S, with at least one carbon atom remaining Unless mentioned otherwise, oxylakylene, dioxyalkylene and thiolakylene groups do not comprise sulfurhydryl or hydroxyl radicals.

Thus, as an example, a C3oxylakylene group under the above definition would be a
—(C$_3$H$_6$)—O— group, bearing two valences, with three carbons or with one or two carbon atoms replaced by S, O or N such as: —CH$_2$CH$_2$CH$_2$—O—, C(CH$_3$)$_2$—O—, —C(C$_2$H$_5$)—O—, —C(O—CH$_3$)—O— . . . Etc Arylene groups represent bivalent groups derived from aryl groups by removal of a further hydrogen atom from a further ring carbon atom. A synonym is arenediyl groups. It represent in particular any monocyclic or polycyclic hydrocarbon group comprising at least one aromatic cycle wherein all ring-atoms are carbon, from which two hydrogen have been removed to create a divalent group.

The arylene groups in the context of the invention may have some ring-atoms substituted with linear or branched alkyl groups or alkoxy groups, or alkylthio groups or halogen atoms where it does not modify the valence of the substituted atom. In any case, the two hydrogen's atoms presented above are removed from a ring-carbon of one of the cycles and not of any of the possible substituted groups.

The arylene groups in the context of the invention may have some ring-atoms substituted with linear or branched (C1-C6) alkyl groups or alkoxy groups, or alkylthio groups or halogen atoms where it does not modify the valence of the substituted atom. In any case, the two hydrogen's atoms presented above are removed from a ring-atom of one of the cycles and not of any of the possible substituted groups.

In the context of the invention, preferable arylene groups are (o,m,p)phenylene, 1,2 naphtylene, 1,5 naphthylene, 1,7 naphthylene, 1,8 naphthylene, toluylene, also known as 2-methyl-phenylene, 3-methyl-phenylene, or 4-methyl-phenylene. Heteroarylene groups represent bivalent groups derived from heteroaryl groups.

The heteroarylene groups in the context of the invention may have some ring-atoms substituted with linear or branched (C1-C6) alkyl groups or alkoxy groups, or alkylthio groups or halogen atoms where it does not modify the valence of the substituted atom. In any case, the two hydrogen's atoms presented above are removed from a ring-atom of one of the cycles and not of any of the possible substituted groups.

The invention will be further illustrated by the following non-limiting examples which are given for illustrative purposes only.

EXAMPLES

In the following examples the tinting enhancer were incorporated in the corresponding polymerizable composition by simple adjunction of the tinting enhancer compounds in the already prepared composition.

It is preferred that the tinting enhancer is introduced after mixing the two monomers together.

Figure 1:
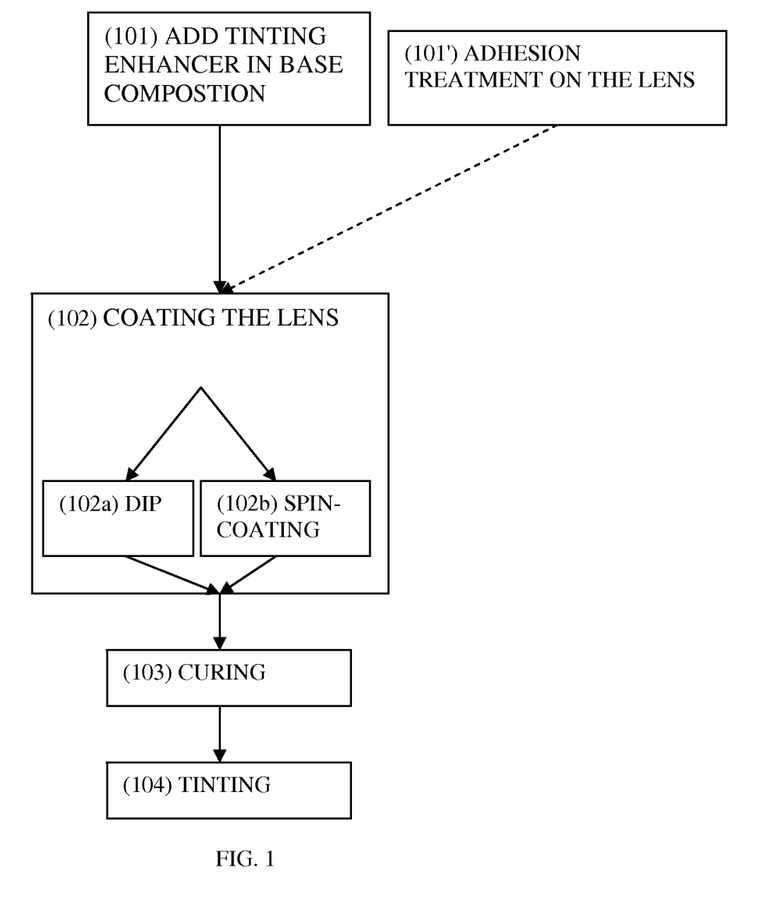
FIG. 1: Flow chart illustrating one embodiment of a process for preparing an optical article according to the invention.

Thus the main steps of the process of the invention are as follow, as described in FIG. 1.
1. Adding tinting enhancers into the known polymerizable composition to make a tintable hardcoat composition according to the invention (step 101).
2. Coating the optical article, such as an ophthalmic lens, with the tintable hardcoat composition of the invention (step 102), by dip-coating (step 102*a*) or by spin coating (step 102*b*)).
3. Curing the tintable hardcoat formulation to form a tintable hard coat (step 103).
4. Exposing the lens substrate covered by the tintable hard coat to a tinting solution (step 104).

An intermediate step 1' might be introduced for preparing the substrate before coating it with the tintable hard coat composition of the invention:

1'. Treating the surface of the lens substrate with an adhesion-promoting agent (step 101').

The performances of the tintable hard coat are evaluated using a particular protocol called hereafter "the Tv20% protocol".

This protocol aims to compare performances after tinting of the lenses by defining a common tinting process.

The protocol comprises a first step of evaluating, through experiments, for a chosen tinting bath (temperature/dye concentration/composition . . . etc) the time needed to tint a CR39 optical lens until the luminous transmittance of said lens attains 20%. This evaluated time is identified as "time 20%".

Then samples to be tested, which can be un-coated lenses or lenses coated on both faces either with a tintable hard coat of the invention or with a reference hard coat, are immersed into the tinting bath for a duration equal to the identified "time 20%".

This enables a calibrated tinting process to all samples and a comparison of tinting performances with regard to the tinting performances of the bath on CR39. The samples might even be in other materials than CR39, such as those defined above: PC or organic materials with a reflective index greater than 1.5. However, whatever the material of the sample's substrate or the material of the hard coat, using the Tv20% protocol, each sample can be compared with a known CR39 reference in term of tinting performances.

On those sample lenses, the luminous transmittance is measured after this tinting step; the lower the transmittance after tinting, the more the dye has penetrated the tintable hard coat.

Further, the mechanical properties of the coated lenses produced in the examples were estimated by measurement of:
Abrasion resistance, using the value obtained from the BAYER test carried out in accordance with standard ASTM F735.81.

A high value in the BAYER test corresponds to a high degree of abrasion resistance.

Scratch resistance using a hand steel wool (HSW) test as defined in EP0614957: Extra fine n° 000 STARWAX© steel wool was used.

A piece of steel wool about 3 cm by 3 cm was folded on itself and used to make 10 to-and-fro rubbing movements on the coated lens in the fibre direction using a constant pressure throughout the operation.

The lens was then rubbed with a dry cloth and rinsed with alcohol.

The state of the lens was then estimated and classified as follows:
0: no observed scratching,
1: lens very slightly scratched (0 to 5 scratches),
2: lens slightly scratched (up to 20 scratches),
3: lens somewhat scratched (up to 50 scratches),
4: lens very scratched (more than 50 scratches),
5: bare substrate.

It is to be noted that both the steel wool test and the sand bayer test were done after the calibrated tinting process using the Tv20% protocol.

Luminous transmittance (also called "relative light transmission factor in the visible spectrum") Tv (or ξv) is defined in the standard ISO 13666:1998 and is measured according to the standard ISO 8980-3 (from 380 to 780 nm), using the same device.

The haze value of the final tinted substrates are measured by light transmission using the Haze-Guard Plus© haze meter from BYK-Gardner (a color difference meter)

according to the method of ASTM D1003-00, which is incorporated herein in its entirety by reference. All references to "haze" values in this application are by this standard. The instrument was first calibrated according to the manufacturer's instructions. Next, the sample was placed on the transmission light beam of the pre-calibrated meter and the haze value was recorded from three different specimen locations and averaged.

In the examples, the following methodology was applied:

Step 1: Adding Tinting Enhancers into a Base Polymerizable Composition to Make the Tintable Hard Coat Composition of the Invention The chosen amount of tinting enhancer is added in the base polymerizable composition. The amount of tinting enhancer is defined in grams of tinting enhancer per 100 grams of base composition. Its value is generally comprised between 0.7% and 4% to achieve a solid content weight percentage of about 2-10% respectively.

Step 2: Treating the Surface of the Sample Lens Substrate with an Adhesion-Promoting Gent For improving the adhesion of the tintable hard coat composition onto the lens substrate, the surface of the lens substrate may be treated with an adhesion-promoting agent such as 3-Aminopropyltriethoxysilane (commercially known as Dynasylanameo or Ameo). The following steps refer to the treatment of a polycarbonate lens with Ameo.

1. Prepare an aqueous solution containing 5 wt % of Ameo.
2. Immerse the lens in solution and apply ultrasound for 5-10 minutes at 50° C.
3. Remove the lens from solution and rinse it with deionized water. The deionized water should form a uniform layer on the lens.
4. Dry the lens in oven at 75° C. for 5 minutes.
5. Cool the lens to room temperature.

This step is not necessary for the application of the invention but is useful to help compare different base polymerizable compositions.

Step 3: Coating the Lens Substrate with the Tintable Hardcoat Composition

The composition prepared in Step 1 is then coated onto the lens prepared in Step 2 using any suitable conventional coating method such as dip-coating and spin-coating to achieve an after-cure coating thickness of about 5-6 µm. for the purpose of the example, the composition is coated of both faces of the lens.

In case of reference samples, a reference composition is coated instead of the composition prepared in Step 1.

In the examples, the substrates are polycarbonate ophthalmic lenses of the kind known in the ophthalmic industry as semi-finished lenses, without any further surface treatment. The ophthalmic lenses were made by using polycarbonates such as homopolycarbonates and particularly homopolycarbonates of bisphenol-A and tetramethyl-3,5-bisphenol-A. Some commercially available polycarbonates may be distributed by GENERAL ELECTRIC Co. under trade name of Lexan®, by TEIJIN under trade name of PANLITE®, by BAYER under trade name BAYBLEND® or by DOW Chemicals under trade name of CALIBRE®.

However it is to be noted that the invention may apply to other substrates used in the ophthalmic industry as the invention does not depends on the substrate itself but on the addition of a specific kind of tinting enhancer into sol-gel hard coats.

Step 4: Curing the Tintable Hardcoat Composition Coating the Lens

The hard coat composition coated onto the lens is then cured in an oven using a suitable temperature and time. For all samples, the conditions used are 70° C. and 20 minutes for initial curing, and 100° C. and 3 hours for post-curing.

Step 5: Tinting the Coated Lens

The coated lenses are then immersed into a tinting bath comprising BPI dye for as long as necessary in order to comply to the Tv(20%) protocol.

Figure 2:
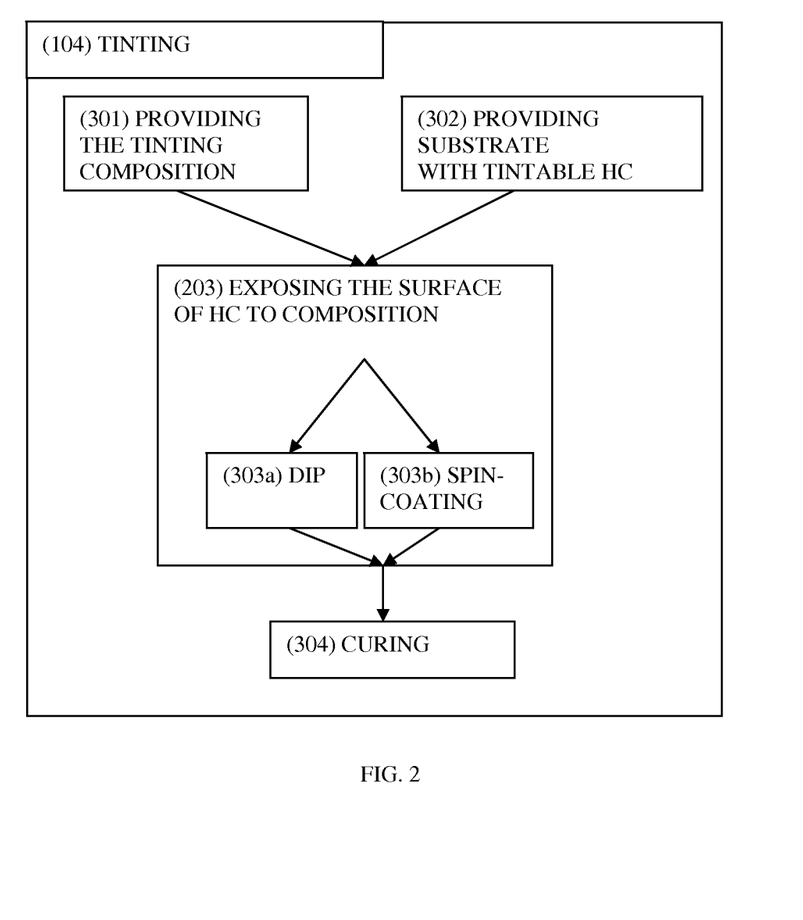
FIG. 2: Flow-chart illustrating one embodiment of the tinting part of the method of the invention.

General tinting process, illustrated by FIG. 2:

The exposure step was done by immersing, in step (303), a coated substrate (provided in step (302)) into a bath of the tinting composition, provided in step (301), for a duration comprised between 10 minutes and 60 minutes with a bath temperature of roughly 95° C., both faces of the substrate being exposed to the tinting composition.

Thereafter, the substrates are rinsed and cured (in step (304)), rinsing may be done using tape water or deionized water. The curing may last, in the examples, for two hours at 135° C. to imbibe the dye into the substrate completely.

The exposure step (303) can be done by immersion of at least part of the substrate in a bath of the tinting composition (step (303a)), this type of exposure step is generally known by the word "dip" or "dipping".

Alternatively, the exposure step (303) can be done by spin-coating (step (303b))) the tinting composition on top of at least part of the substrate.

Five reference compositions (Ref1 to Ref5) were prepared:

Ref 1: a reference coating, made using PDQC® composition, as provided by SDC Technologies, Inc., used according to the provider instructions.

Ref 2: a first tintable reference coating, which corresponds to the following composition:
γ-Glycidoxypropyltrimethoxysilane: 5-10%
Glycidoxypropylmethyldiethoxysilane: 20-30%
30% colloidal silica in methanol: 35-45%
Aluminum acetylacetonate (Al(AcAc)): 0.5%
HCl 0.1N: 3-8%
Dowanol PM solvent: 5-10%
Methanol: 5-10%.

Ref 3: It corresponds to the composition of the example 3 of patent EP0614957 (B1), which example is incorporated by reference and recites as follows in said patent:

"80 parts of 0.1N hydrochloric acid were added dropwise to a solution containing 224 parts of GLYMO and 120 parts of DMDES.

The hydrolysed solution was stirred for 24 hours at room temperature and then 718 parts of 30% colloidal silica in methanol, 15 parts of aluminium acetylacetonate and 44 parts of ethylcellosolve were added.

A small amount of surfactant was added.

The TDC of the composition was in the order of 13% of solid material from the hydrolyzed DMDES."

GLYMO being defined in said patent as γ-Glycidoxypropyltrimethoxysilane.

DMDES being defined in said patent as Dimethyldiethoxysilane.

TDC signifies the theoretical dry content.

The total dry content obtained was of roughly 35% of the composition.

Ref 4: It corresponds to the composition of the example 1 of U.S. Pat. No. 8,084,133 (B2), which example is incorporated by reference and recites as follows in said patent:

"γ-Glycidoxypropyltrimethoxysilane, 775 grams, and a dilute solution of nitric acid, 77.5 grams, prepared by adding 1.0 gram of 70 weight percent nitric acid to 7 L of deionized water, were added to a clean, dry 5 L reactor with stirring. Within fifteen minutes, the exotherm generated from the hydrolysis of the silanes caused an increase in the temperature of the reaction mixture from 20° C. to 35° C. A 50/50 weight ratio of DOWANOL® PM and PMA solvents, 744 grams, was added to the mixture with stirring and the temperature of the reaction mixture was lowered to 15° C. with an ice bath. Titanium n-butoxide (693 grams) was added and the resulting exotherm caused an increase in the temperature of the reaction mixture within 15 minutes to 30° C. The temperature of the reaction mixture was lowered to 15° C. with an ice bath. Cerium oxide, 704 grams of a 20 weight percent aqueous solution was added and the resulting exotherm caused an increase in the temperature of the reaction mixture within 15 minutes to 30° C. The temperature of the reaction mixture was lowered to 20-25° C. with an ice bath. Ammonium hydroxide, 39 grams of a 29 weight percent aqueous solution, was added to adjust the pH from 3 to 7. A magenta dye solution, 119 grams, prepared as a 25 weight percent solution of MORPLAS® magenta dye in a 50/50 weight ratio of DOWANOL® PM and PMA solvents, was added to the reaction mixture with stirring. A mixture of trimethylolpropane triglycidyl ether, 404 grams, 50/50 weight ratio of DOWANOL® PM and PMA solvents, 940 grams, and BYK®-306 additive, 4.5 grams, which is reported to be a polyether modified dimethylpolysiloxane copolymer in solvent, was added and the resulting mixture was stirred for at least 30 minutes maintained at a temperature of 20-25° C. The resulting coating solution was filtered through a nominal 0.45 micron capsule filter and stored at −20° C. until use. The refractive index of the coating solution was 1.58."

The total dry content obtained was of roughly 30% of the composition.

Ref 5: which corresponds to a composition of the following composition:

TetraEthoxySilane (TEOS): 3-6%
HCl 0.1N: 1-3%
γ-Glycidoxypropyltrimethoxysilane: 10-20%
Glycidoxypropylmethyldiethoxysilane: 1%
30% colloidal silica in methanol: 30-40%
Dowanol PM: 10-20%
Aluminum acetylacetonate (Al(AcAc)): 1.5%
Methanol 0.5%, mixed with a small amount of surfactant.

The total dry content obtained was of roughly 30% of the composition.

Those five references compositions were applied on base 2 plano optical lenses of polycarbonate according to the coating process described above. Those five references were then evaluated according to the Tv(20%) protocol cited above. The film thickness and performances according to the Tv(20%) protocol described above are given in the table 1 below were Tv % is the transmittance value after tinting, HSW are results of Hand Steel Wool cross hatch test, as described above.

TABLE 1

| Hardcoat | Thickness (μm) | Tv % | Sand bayer | HSW |
|---|---|---|---|---|
| Ref 1 | 5.5 | 58 | 1.3 | |
| Ref 2 | 6.3 | 48 | 2.4 | 5 |
| Ref 3 | 4.0 | 79 | 3.4 | 3 |
| Ref 4 | 5.9 | 76 | 3.6 | |
| Ref 5 | 4.0 | 91 | 6.9 | |

Multiple compositions were created in order to illustrate the performances of some of the tinting enhancers of the invention in some sol-gel hard coat corresponding to the polymerizable composition adapted to the invention.

The tables 2 and 3 below synthesise the samples created, giving the thickness of the film (HC thickness) deposited on the lens, the reference composition used as a basis (main HC composition), the amount (in grams) of tinting enhancer that was added for 100 grams of polymerizable composition (liquid), and the quantity (moles) of tinting enhancer per 100 grams of solid content (SC) of polymerizable composition before deposition on a lens and before curing.

Table 2 shows the tinting hard coat compositions of the invention as based on the polymerizable composition Ref 3 described above.

TABLE 2

| Main HC composition | Ref 3 (SC~35%) | | | | | | | | | |
|---|---|---|---|---|---|---|---|---|---|---|
| Tinting Enhancer | SO$_2$DP | | | SDP | | EODP | | DOHBP | BPA | |
| wt % of tinting enhancer | 1.4 | 2.1 | 2.1 | 1.05 | 1.4 | 1.4 | 2.1 | 1.4 | 1.4 | 2.1 |
| HC Thickness [μm] | 4.9 | 4.2 | 6.4 | 5.3 | 5.4 | 5.0 | 5.5 | 6.4 | 5.0 | 6.4 |
| Mol per 100 g of SOLID CONTENT | 1.6E-02 | 2.4E-02 | 2.4E-02 | 1.4E-02 | 1.8E-02 | 1.6E-02 | 2.4E-02 | | | |

Table 3 shows the tinting hard coat compositions of the invention as based on the polymerizable composition Ref 4 and Ref 5 described above.

TABLE 3

| Main HC composition | Ref 4 (SC~30%) | | | Ref 5 (SC~30%) | | | |
|---|---|---|---|---|---|---|---|
| Tinting Enhancer | SO$_2$DP | MSP | | SO$_2$DP | SDP | | MSP |
| wt % of tinting enhancer | 1.8 | 1.2 | 1.2* | 1.8 | 1.5 | 2.7 | 3.6 | 3.6 |

TABLE 3-continued

| HC Thickness [μm] | 4.0 | 5.4 | 5.4 | 4.8 | 4.7 | 4.8 | 5.0 | 4.0 |
|---|---|---|---|---|---|---|---|---|
| Mol per 100 g of SOLID CONTENT | 2.40E−02 | 2.85E−02 | 2.85E−02 | 2.40E−02 | 2.29E−02 | 4.12E−02 | 5.50E−02 | 8.56E−02 |

In these two tables, the tinting enhancers cited corresponds to the following compounds:

4,4'-Sulfonyldiphenol (SO$_2$DP), CAS No: 80-09-1, $M_n$: 250.27 g/mol

4,4'-Thiodiphenol (SDP), CAS No: 2664-63-3, $M_n$: 218.27 g/mol

4-(Methylmercapto)phenol (MSP), CAS NO: 1073-72-9, $M_n$: 140.2 g/mol

Bisphenol A (BPA), CAS No: 80-05-7, $M_n$: 228.29 g/mol 4,4'-Dihydroxybiphenyl (DOHBP), CAS No: 92-88-6, $M_n$: 186.21 g/mol 3,3'-(Ethylenedioxy)diphenol (EODP), CAS NO: 61166-00-5, $M_n$: 246.26 g/mol Some further samples, Mixed 1 and Mixed 2, made using mixes of tinting enhancer, were prepared according to the conditions described in table 4 below:

TABLE 4

| Main HC composition | Ref 3 | | |
|---|---|---|---|
| wt % of tinting enhancer | SO$_2$DP | SDP | Coating Thickness on lens |
| Mixed 1 | 1.8 | 0.3 | 5.7 μm |
| Mixed 2 | 1.4 | 0.7 | 5.5 μm |

The results of the performance evaluation according to the Tv(20%) protocol described above are given in the tables 5, 6 and 7 below:

Table 5 gives the performance results obtained for samples exposed in table 2, based on reference polymerizable composition 3, wherein a tinting enhancer was mixed, the obtained tintable hard coat being deposited on a lens as described above with the thickness described in table 2.

TABLE 5

| Main HC composition | Ref 3 | | | | | | | | | |
|---|---|---|---|---|---|---|---|---|---|---|
| Tinting Enhancer | SO$_2$DP | | SDP | | EODP | | DOHBP | | BPA | |
| wt % of tinting enhancer | 1.4 | 2.1 | 2.1 | 1.05 | 1.4 | 1.4 | 2.1 | 1.4 | 1.4 | 2.1 |
| Tv (%)* | 61 | 55 | 40 | 56 | 48 | 64.6 | 54 | 61.9 | 61 | 44 |
| Sand Bayer | NA | 2.7 | 2.9 | 1.4 | NA | 3.0 | NA | NA | NA | 2.6 |
| HSW | 3 | 3 | 3 | 5 | 5 | 3 | 3 | 3 | NA | 3 |
| Haze (%) | NA | 0.1 | NA | NA | NA | NA | NA | NA | NA | NA |
| HC Thickness [μm] | 4.9 | 4.2 | 6.4 | 5.3 | 5.4 | 5.0 | 5.5 | 6.4 | 5.0 | 6.4 |

Table 6 gives the performance results obtained for samples exposed in table 3, based on reference polymerizable composition 4 or 5, wherein a tinting enhancer was mixed, the obtained tintable hard coat being deposited on a lens as described above with the thickness described in table 3.

TABLE 6

| Main HC composition | Ref 4 | | | Ref 5 | | | | |
|---|---|---|---|---|---|---|---|---|
| Tinting Enhancer | SO₂DP | MSP | | SO₂DP | | | SDP | MSP |
| wt % of tinting enhancer | 1.8 | 1.2 | 1.2* | 1.8 | 1.5 | 2.7 | 3.6 | 3.6 |
| Tv (%) | 61 | 30 | 15 | 76 | 73 | 63 | 52 | 61.4 |
| Sand Bayer | 3.9 | 1.8 | 1.8 | 4.2 | 1.9 | 1.3 | NA | NA |
| HSW | NA | 5 | 5 | NA | NA | NA | NA | NA |
| Haze (%) | NA | NA | 0.17 | NA | NA | NA | NA | NA |
| HC Thickness [μm] | 4.0 | 5.4 | 5.4 | 4.8 | 4.7 | 4.8 | 5.0 | 4.0 |

*The tinting time is 60 min. Steel wool and sand bayer results are obtained after tinting.

Table 7 gives the performances of samples Mixed 1 and Mixed 2 according to the to the Tv(20%) protocol described above.

TABLE 7

| Main HC composition | | | Ref 3 | | |
|---|---|---|---|---|---|
| wt % of tinting enhancer | SO₂DP | SDP | Coating Thickness on lens | Tv (%) | Hand Steel wool |
| Mixed 1 | 1.8 | 0.3 | 5.7 μm | 53.8 | 3 |
| Mixed 2 | 1.4 | 0.7 | 5.5 μm | 57.1 | 5 |

From Table 5, 6 and 7, it is shown that the tintability (Tv %) of all tested reference polymerisable composition (Ref 3, Ref 4 and Ref 5) has been improved significantly after the phenol-based additive is added into even though the amount is low. And the abrasion resistance is consistently better than the one obtained for Ref 1 unmodified.

The tintability and mechanical properties of hard coat made out of polymerisable composition Ref 3 modified by addition of 2.1 wt % SO₂DP (6 wt % of final solid content) are better than that of tintable composition reference Ref1 and Ref 2. The tintability of polymerisable composition Ref 4 modified by addition of MSP can achieve a tint of class 3 (Tv <15%) in a short tinting time (60 min), haze is only 0.17% and sand bayer value is of 1.8, but HSW is 5. It is to be noted that when further anti-reflective stack was applied on it, the sand bayer value increased up to 3.2-3.5.

Further, in polymerisable composition Ref 4, the addition of 1.8 wt % SO₂DP gives roughly the same performances as when this tinting enhancer is added into Ref3 polymerisable composition with an amount of 1.4% wt. It is thus expected that an amount of about 2.1% or 2.5% of SO₂DP would lead roughly to the same tinting and abrasion resistance performances as polymerisable composition Ref 3 modified by addition of 2.1% SO₂DP.

The mechanical properties (sand bayer and HSW) are maintained close to the values obtained for the un-modified coating for the samples where the polymerizable composition is modified by addition of SO₂DP only.

It is to be noted that for each given tinting enhancer, as the amount of tinting enhancer increases, especially the Tv20 value or the tinting kinetics, conversely the mechanical properties of the coating diminishes, especially, Bayer value and hand steel wool performances.

Depending on the base composition of the hard coat layer (Ref 3, Ref 4 or Ref 5) it is noted that the composition that have both a tintability and an abrasion resistance at least as good as Ref 1 are provided with amounts of tinting enhancer comprised between 0.01 mol per 100 grams of composition's solid contents and 0.05 mol per 100 grams of composition's solid contents included, and preferably comprised between 0.02 mol per 100 grams of composition's solid contents and 0.03 mol per 100 grams of composition's solid contents.

In particular, the tinting enhancer is preferably present with an amount smaller than about 10% by weight of solid content, preferably it is comprised between 3% in weight to 8% in weight, included.

However, the man skilled in the art will know that these values may change depending on the formulation of the composition used as base for the hard coat, while being in the same order of magnitude.

The invention claimed is:

1. A tintable hard coat composition capable of forming a film on an optical article, the composition comprising at least one tinting enhancer and at least two polymerizable monomers, further defined as a first monomer that is a hydrolysat of an alkoxysilane comprising at least two alkoxy groups and one epoxy group, and a second monomer that comprises at least two functional groups capable of reacting with the first monomer, at least one of the two monomers having three functional groups of the same kind; wherein the tinting enhancer comprises 4-(methyl mercapto) phenol, and/or 3,3'-(Ethylenedioxy)diphenol; and
   wherein the tinting enhancer is comprised in an amount in a range of 0.01 mol/100 g of solid content to 0.05 mol/100 g of solid content.

2. The composition of claim 1, wherein the first monomer is a hydrolysat further defined as 3-glycidoxypropyltrimethoxysilane or glycidoxypropylmethyldiethoxysilane.

3. The composition of claim 1, wherein the second monomer is a polyglycidylether, a hydrolysat of a poly alkoxysilane, or a mixture thereof.

4. The composition of claim 3, wherein the second monomer is dimethyl-diethoxy-silane, tetraethoxy-silane, trimethylolpropane triglycidyl ether, or a mixture thereof.

5. The composition of claim 1, further comprising at least one oxidized metal compound further defined as a cerium oxide, silicon oxide, tantalum oxide, tin oxide, titanium oxide, titanium alkoxide, or zirconium oxide.

6. The composition of claim 1, wherein the tinting enhancer comprises between 3% and 8% by weight of solid content of the composition.

7. An optical article comprising a hard coat layer formed by the tintable hard coat composition of claim 1.

8. The optical article of claim 7, further defined as an ophthalmic lens.

9. The optical article of claim 7, wherein the hard coat layer is further defined as tinted.

10. The optical article of claim 9, further comprising at least one anti-reflective stack on top of the tinted hard coat layer.

* * * * *